July 8, 1952          E. DAWSON          2,602,587
COMPONENT RESOLVER

Filed Nov. 26, 1948          2 SHEETS—SHEET 1

INVENTOR
EDWARD DAWSON
BY
Herbert H. Thompson
his ATTORNEY

Patented July 8, 1952

2,602,587

UNITED STATES PATENT OFFICE 2,602,587

COMPONENT RESOLVER

Edward Dawson, New York, N. Y., assignor to The Sperry Corporation, Great Neck, N. Y., a corporation of Delaware Application November 26, 1948, Serial No. 61,992

3 Claims. (Cl. 235—61.5)

This invention relates generally to computer mechanisms and has reference more particularly to component resolver mechanisms. In many computing problems in which information is obtainable in polar coordinates it is desirable to convert the information from polar coordinates to rectangular coordinates. In previous computers, such as, for example, that disclosed in Patent No. 2,235,826 to W. E. Chafee, dated March 25, 1941 for Aircraft Fire Control System, resolvers have been used to convert from polar coordinates to rectangular coordinates. However, the percentage accuracy of the component resolvers used in such computers did not have to be extremely high because of the fairly limited range of operation of the computer. However, in recent years, the use of radar for detecting targets has increased the range of operation of computers many fold. For example, targets can be "seen" through radar a great many miles away. With such greatly increased operating ranges, it is necessary to use component resolvers having an extremely high degree of percentage accuracy and the use of component resolvers of the above type would be quite undesirable since the increased scale factors would require a component resolver of extreme size and bulk, and yet not increasing the accuracy appreciably. However, a component resolver operating on the principles of the present invention would give a very high degree of accuracy at extreme operating ranges while at the same time limiting the size and bulk of resolver.

Therefore the principal object of the present invention is to provide a component resolver which is capable of solving a given component resolving problem involving extreme ranges with great accuracy.

Another object of the present invention is to provide a component resolver mechanism which operates by mere addition and subtraction of functions of single variables.

Other objects and advantages not at this time more particularly enumerated, will be clearly understood from the following detailed description of the same when taken in connection with the accompanying drawings wherein.

Let us now consider a conventional component resolving problem wherein a linear vector value that is, a value representing the range and bearing of a target, is obtainable from say a radar system. From the radar system we get a linear vector value which we will designate R, sometimes called the slant range, which designation indicates the distance between a radar tracking apparatus and a target. The angle of the linear vector, designated by the letter B, is the angle formed by the slant range R and a horizontal line L. Thus, there is formed a right triangle, the hypotenuse being the slant range R, one leg the horizontal base line L, and the other leg being the vertical line V from the target to the horizontal base line L. It will be seen then that certain trigonometric relations may be evolved from the data given. Since R is known and the angle B is known, it follows that the distance along the base line L between the intersection of the vertical line therewith and the radar is equal to R cos B; and that the distance along the vertical line V to the intersection of the slant range R therewith is equal to the value R sin B. In computing, for example, gun data such as future target position, it is desirable to convert the polar coordinate values to rectangular coordinate values. The polar coordinate values (R, B) of the target T which is obtained from the radar apparatus as input data is resolved into the corresponding rectangular coordinate values $(x, y)$ of the target position in the following manner. By the apparatus of the present invention the present resolver converts the linear value of the vector R to an angle A whose sine is equal to the value of the vector. The angle B is supplied directly to the resolver. The rectangular coordinates $x$ and $y$ of the target position may be represented by the terms sin A cos B and sin A sin B, respectively. These trigonometric terms may be represented by their equivalents $$\frac{\sin (A-B) + \sin (A+B)}{2}$$

and $$\frac{\cos (A-B) - \cos (A+B)}{2}$$

respectively. Therefore, by obtaining an angle A whose sine is equal to the said value R and employing the value of angle B directly, the above-mentioned trigonometric relations may be used to solve for values of $x$ and $y$.

Figure 3:
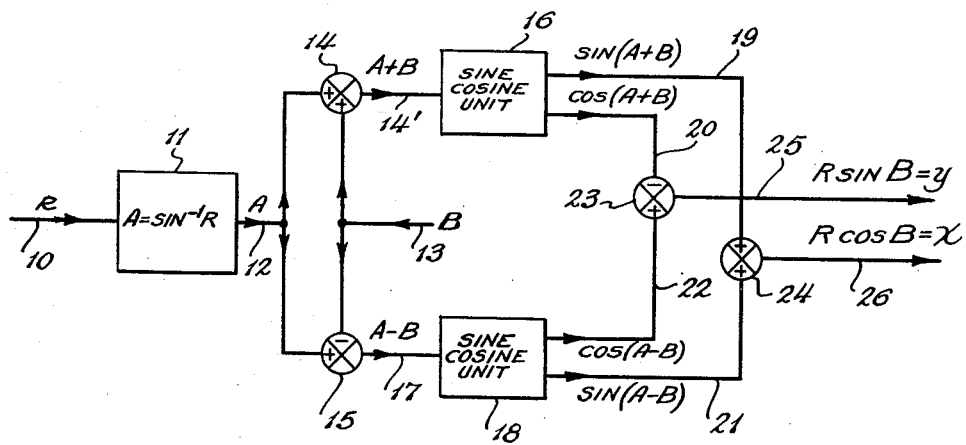
Fig. 3 is a schematic diagram illustrating the trigonometric relations and flow of information involved.

The schematic diagram shown in Fig. 3 illustrates the functions of the various elements included in the invention and how the trigonometric equations involved are solved. As above stated, the principles of the present invention are based on these trigonometric relations:

(1) $R = \sin A$ (2) $2 \sin A \sin B = \cos(A-B) - \cos(A+B)$ (3) $2 \sin A \cos B = \sin(A-B) + \sin(A+B)$.

Figure 1:
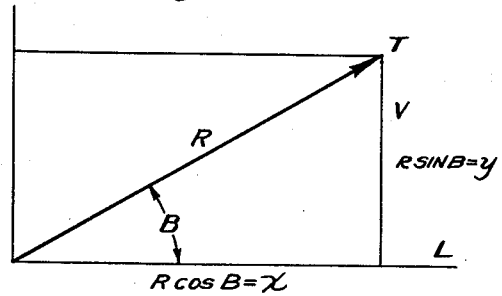
Fig. 1 is a graphical representation of a typical component resolving problem.
Figure 2:
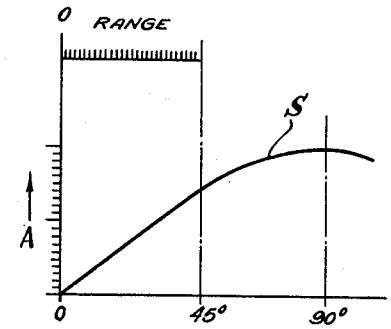
Fig. 2 is a graph for representing one of the variables of the given problem.
Figure 4:
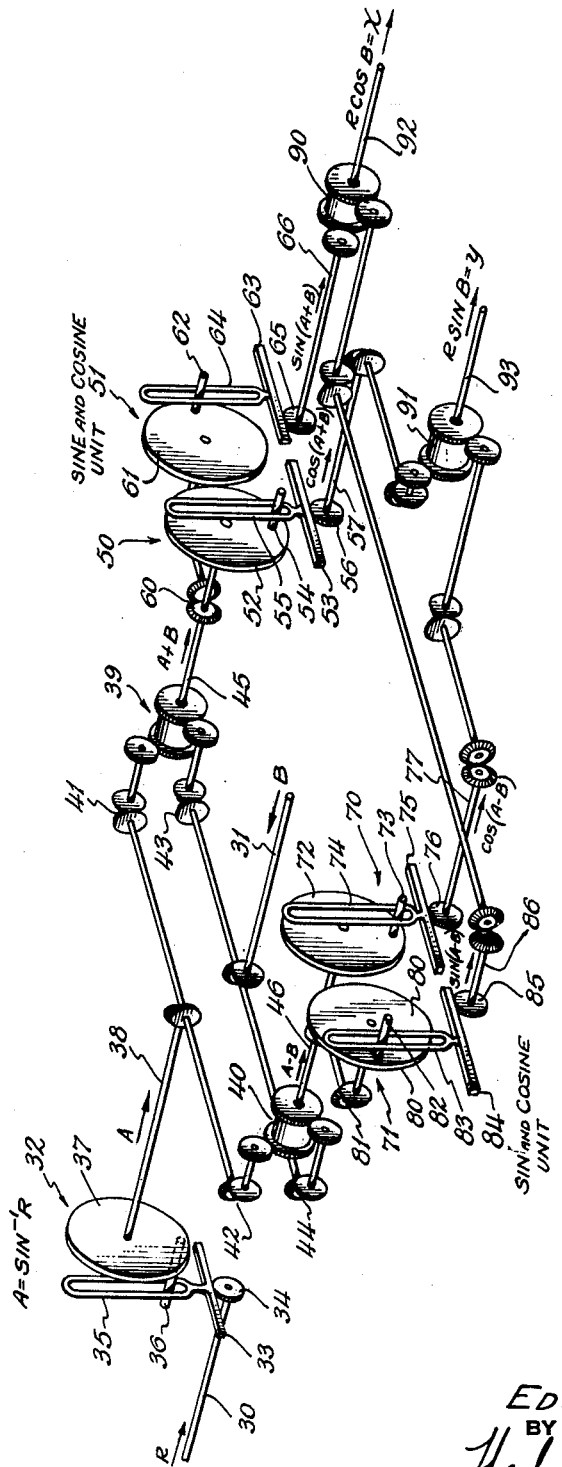
Fig. 4 is a schematic representation of one form of component resolver mechanism of the present invention.

Substituting values of A and B in Equations (2) and (3) we can then solve for 2 sin A sin B and 2 sin A cos B. The numeral 2, a constant, may be dropped, and since $\sin A = R$ the solution of Equations (2) and (3) will give the values R sin B and R cos B or $x$ and $y$. The first input, represented by reference character 10, has associated therewith an arc sine computer represented generally by box 11. Input 10 represents a measure of the linear value of the vector R or slant range as illustrated in Fig. 1. The arc-sine computer 11 which solves Equation (1) above converts a measure of the linear value of the range R to a measure A which is proportional to the angle whose sine is the linear value. In other words, letting A represent the output of the arc-sine computer appearing at 12, then $A = \sin^{-1} R$. Then, in Equation (1) above, the term A represents an angle, the sine of which is equal to the particular linear vector value, or, in the present case, the range R. This angle is arbitrary and its maximum value is representative of the maximum value of the range R for which the device is designed. In actual practice, however, the angle A is kept small, that is, 45° or less, for the practical reason that the substantial linear function may be represented more accurately and advantageously by means of a cam or other suitable mechanical movement than a function of considerable curvature. The mathematical relation is, however, exact regardless of which portion of the curve S of Fig. 2 is used. The second input represented in Fig. 3 appears at 13 and is a measure of the angle of the slant range R and is represented in Figs. 3 and 4 by the letter B. The two inputs A and B appearing at 12 and 13 respectively, are simultaneously applied to two differential mechanisms 14 and 15, the differential 14 providing the sum of the values A and B and the differential 15 providing the difference of the values A and B. The output of differential 14 appearing at 14' is applied to a first sine and cosine unit represented by box 16 while at the same time the output of differential 15 appearing at 17 is applied to a second sine and cosine unit as represented by box 18. The sine and cosine unit 16 provides two outputs, the one appearing at 19 being equal to the sine of the sum of the values A and B and the other, appearing at 20, being equal to the cosine of the sum of the values A and B. Similarly, the sine and cosine unit 18 provides a pair of outputs, the one appearing at 21 being equal to the sine of the difference of the values A and B, and the other, appearing at 22, being equal to the cosine of the difference of the values A and B. A differential 23 is provided to combine the cosine outputs of the sine and cosine units 16 and 18, and another differential 24 is provided to combine the sine outputs of the sine and cosine units 16 and 18. Differential 23 is arranged to provide an output equal to the difference between the cosine of the difference of the two values A and B and the cosine of the sum of the two values A and B. In a like manner, the differential 24 is arranged to provide an output equal to the sum of the sine of the difference of the two values A and B and the sine of the sum of the values A and B. The output of the differential 23 appearing at 25 is then equal to the value $\cos(A-B) - \cos(A+B)$ which, by Equation (2) above is equal to 2 sin A sin B. The output of the differential 24 appearing at 26 is equal to $\sin(A-B) + \sin(A+B)$ which by Equation (3) above is equal to 2 sin A cos B. Since by Equation (1) above, $R = \sin A$, that is, the output of the arc-sine computer 11, R can be substituted for its equal sine values in the outputs 25 and 26, the constant being eliminated by proper selection of mechanical gear ratios or electrical connections. Therefore, it can be seen that the output appearing at 25 is equal to R sin B, which as stated above is equal to the vertical component of the linear vector value R as set forth in Fig. 1; and similarly the output 26 is equal to R cos B, which is equal to the horizontal component of the linear vector value R represented in Fig. 1.

From the foregoing, then, it will be noted that there is provided a computer mechanism for solving a component resolving problem which converts polar coordinates to rectangular coordinates by mere addition and subtraction of functions of single variables and thereby eliminating the use of complicated, expensive and error producing devices for performing operations of multiplication such as are found in conventional component resolving mechanisms.

It will be understood that the component resolver of the present invention may involve the use of electrical units such as functional potentiometers and differential selsyns or other equivalents, and any reference to shaft rotations may be considered as an electrical signal responsive to the measures of the stated values.

Referring now to Fig. 4, there is illustrated one form which the invention may assume, this form being completely mechanical in its operation. The principal computing mechanism of this embodiment is the Scotch yoke, a mechanism which derives a sine or cosine output for a given rotational input. In Fig. 4 a pair of input variables, which represent the two values, R and B of polar coordinates, are represented as shaft rotations. The first being proportional to the linear value of the vector R shown in Fig. 1; this value appearing as a rotation of shaft 30. The other variable B is proportional to the angle of the vector R, this variable appearing as a rotation of shaft 31 in the drawings.

In Fig. 2 there is shown a diagram which illustrates the relationship between the value of the range and the rotation of the disc 37 of Scotch yoke 32 by rotation of shaft 30, the rotation being limited to a suitable angle, say 45°. The reason for such limitation is that only the substantially linear portion of the sine curve S is used. Then, by calibration, this portion of the curve represents a particular range. Of course, the proportionality may be smaller or greater whereby the limited rotation of the disc 37 by shaft 30 in Fig. 4 may represent any range depending upon the proportionality factor used. The choice of the angle A which varies from zero to the maximum value of the linear vector value R is an arbitrary angle selected for the design requirements of the apparatus, and, as above stated, the maximum angle A corresponds to the maximum value of the linear vector, in the present case the range R.

Shaft 30 which as above-mentioned represents a particular range is used as an input to an arc-sine computer generally indicated by the reference character 32. Essentially, the arc-sine computer 32 comprises a Scotch yoke which is operated in reverse. In other words, the linear value of the range R appearing as a rotation of shaft 30 displaces a rack 33 through gear 34. The rack 33 has mounted thereon a yoke member 35 which engages between the arms thereof a pin 36 fixedly attached to a disc 37 so that any displacement of rack 33 produces a rotation of the disc 37. The rotation of disc 37 is proportional to the arc-sine of the rotation of the shaft 30. Disc 37 has attached thereto an output shaft 38 which rotates with the disc 37 in an amount equal to the arc-sine of the range, or by letting A equal the output appearing on shaft 38, $A=\sin^{-1}R$. The value A is applied as an input to a first pair of differential mechanisms indicated generally at 39 and 40 through gear trains 41 and 42 respectively.

The second input to the component resolver appearing on shaft 31 as stated above, is a measure of the angle of the range R represented by the letter B. Rotation of shaft 31 applies the value B as a second input, to the first pair of differential mechanisms 39 and 40 through gear trains 43 and 44, respectively. The differential 39 is arranged to produce an output appearing on shaft 45 equal to the sum of the values A and B. Similarly, the output of the differential 40 appearing on shaft 46 is equal to the difference of the values A and B. Shaft 45 supplies an input to a first sine and cosine computing mechanism which comprises a pair of Scotch yokes indicated generally by reference characters 50 and 51. The rotation of shaft 45 rotates one element 52 of the Scotch yoke mechanism 50 to produce a translation of a rack 53, through the action of a pin 54 fixed to the disc 52 engaged between the arms of a yoke 55 which is attached to the rack 53. Meshing with rack 53 is a gear 56 having attached thereto a shaft 57 so that upon translation of rack 53, shaft 57 is rotated in an amount equal to the cosine of the sum of the values A and B. The output of differential 39 appearing as a rotation of shaft 45 is applied to the second Scotch yoke mechanism 51 through appropriate gears 60 to rotate disc 61. A pin 62 is attached to disc 61 and is displaced 90° from the pin 54 of the first Scotch yoke 50 and is adapted to displace upon rotation thereof a rack 63 through yoke 64. The 90° displacement of the pins 55 and 62 produces a rotation of shafts 57 and 66 which is 90° out of phase. Meshing with the rack 63 is a gear 65 adapted to rotate shaft 66 upon translation of the rack 63, the rotation of shaft 66 being equal to the sine of the sum of the two values A and B. Therefore the output of the sine-cosine unit 50 and 51 is the rotation of the shafts 57 and 66. The first being equal to the cosine of the sum of the two variables A and B and the second being equal to the sine of the sum of the two values A and B or shaft 57 rotates proportionally to cos $(A+B)$ and shaft 66 rotates proportionally to sin $(A+B)$.

The output of the second differential mechanism 40 appearing as a rotation of shaft 46 serves as an input to a second sine and cosine unit indicated generally at 70 and 71. The operation of the second sine and cosine unit is identical with that of the first sine and cosine unit 50 and 51. Shaft 46 rotates disc 72 in accordance with the sum of the values A and B which rotates pin 73 engaged between the arms of yoke 74 to translate rack 75. The translation of rack 75 rotates gear 76 in an amount equal to the cosine of the difference of the variables A and B which rotation appears on shaft 77. In a similar fashion disc 80 rotated by shaft 46 through gear train 81 rotates pin 82 engaged between the arms of yoke 83 to produce a displacement of rack 84. The gear 85 then rotates in an amount equal to the sine of the difference of the variables A and B which rotation appears at shaft 86. Again the pin 82 is displaced 90° from pin 73 to produce a displacement of racks 75 and 84 which is 90° out of phase. Therefore, the output of the second sine and cosine unit 70 and 71 is represented by a pair of shaft rotations equal to the cosine of the difference of the two values A and B and the sine of the difference of the two values A and B or the rotation of shaft 77 is proportional to cos $(A-B)$ and of shaft 86 proportional to sin $(A-B)$.

A second pair of differentials 90 and 91 are provided to combine the outputs of the two sine and cosine units. One input to the differential 90 is the rotation of shaft 66 from sine unit 51 and the other input to the differential 90 is the rotation of shaft 86 from the sine unit 71. The output of the differential 90 appears on shaft 92 and is equal to sin $(A-B)$ + sin $(A+B)$. Similarly, one input of the differential 91 is the rotation of shaft 57 equal to the cosine of the sum of the values A and B and the other input is the rotation of shaft 77 equal to the cosine of the difference of the two values A and B. The output of the differential 91 appearing on shaft 93 is equal then to cos $(A-B)$ − cos $(A+B)$.

As stated above, the value cos $(A-B)$ − cos $(A+B)$ is equal to 2 sin A sin B. But since sin A is equal to R as computed by the arc sine computer 32, the 2 sin A term may be replaced by its equal R in equation (2) above. Similarly, sin $(A-B)$ + sin $(A-B)$ is equal to 2 sin A cos B, and again since sin A is equal to R, R may be substituted for its equivalent equation (3) above-mentioned. The constants of the equations may be eliminated or compensated for by the proper selection of gear ratios. Therefore, it will be seen that the outputs of the component resolver of the present embodiment of the invention are shaft rotations equal to R sin B and R cos B, these two values being the planar components of the linear vector value R obtained by the range measuring apparatus.

It will be understood, of course, that any type of sine-cosine unit may be employed in the above embodiment of the invention without departing from the scope thereof.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A component resolver for resolving a linear vector value into its two planar components comprising means for converting a measure of the linear value to a measure proportional to the angle whose sine is the said linear value, means for algebraically combining the latter measure with a measure of the angle of said linear value, means connected to receive the combined measures for providing separate measures of the sine and cosine of the sum and difference of the combined measures, means for algebraically combining the separate measures of the sines of the sum and difference of the combined measures and the separate measures of the cosines of the sum and difference of the combined measures, whereby the output of the last means is proportional to the product of the linear value and the sine of the angle of said linear value, and the product of the linear value and the cosine of the angle of said linear value.

2. A component resolver for resolving a linear vector value into its two planar components comprising first means providing a first input data proportional to the linear value, second means for providing a second input data proportional to the angle of said linear value, means associated with said first means for converting the linear value of said first input data to a converted input data proportional to the angle whose sine is the said linear value, a first pair of differential means for obtaining the sum and difference of said converted input data and said second input data, means for obtaining separate sine and cosine functions of the outputs of said first pair of differential means, and a second pair of differential means for separately combining the sine outputs and the cosine outputs respectively of said last means, whereby the outputs of the last differential means is proportional respectively to the product of the linear value and the sine of the angle of said linear value, and the product of the linear value and the cosine of the angle of said linear value.

3. A component resolver for resolving a linear vector value into its two planar components comprising a first input means having a shaft rotation proportional to the linear value, a second input means having a shaft rotation proportional to the angle of said linear value, means associated with said first input means for converting the linear value of the shaft rotation to a shaft rotation proportional to the angle whose sine is the said linear value, a first pair of differential means for producing shaft rotations proportional to the sum and difference of the first converted shaft rotation and the second shaft rotation, a pair of sine and cosine units for producing separate shaft rotations proportional to sine and cosine functions of the outputs of said first pair of differential means, a second pair of differential means for producing separate shaft rotations proportional to the combined sine outputs and cosine outputs of said pair of sine and cosine units, whereby the last shaft rotations are respectively proportional to the product of the linear value and the sine of the angle of said linear value and the product of the linear value and the cosine of the angle of said linear value.

EDWARD DAWSON.

REFERENCES CITED

The following references are of record in the file of this patent:

UNITED STATES PATENTS

| Number | Name | Date |
|---|---|---|
| 2,385,952 | Svoboda | Oct. 2, 1945 |

FOREIGN PATENTS

| Number | Country | Date |
|---|---|---|
| 140,441 | Great Britain | Apr. 28, 1921 |